Dec. 10, 1963 C. A. CARLSON 3,113,733
APPARATUS AND METHOD FOR EXTRACTING TRASH
Filed Oct. 13, 1960 2 Sheets-Sheet 1
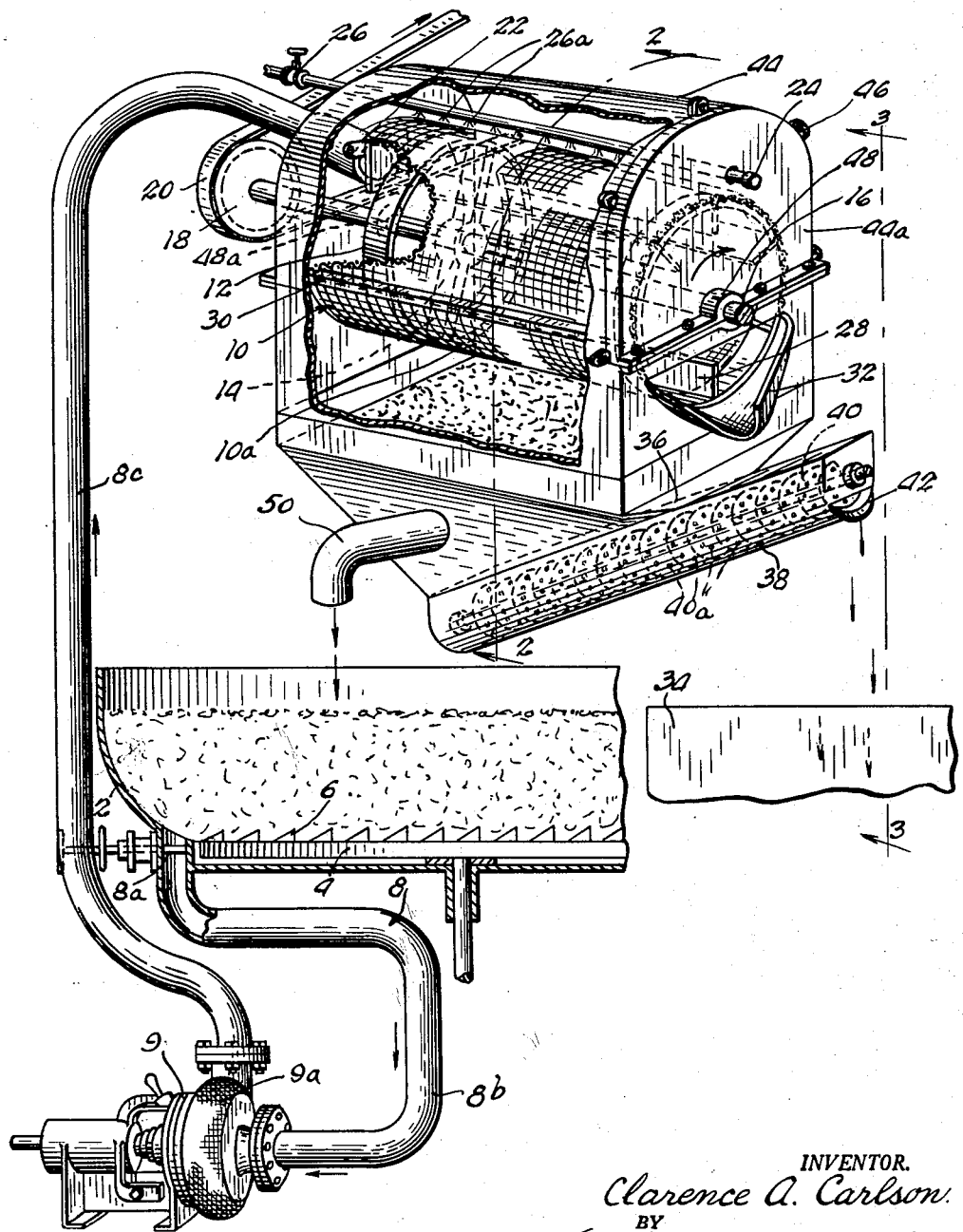
INVENTOR.
Clarence A. Carlson

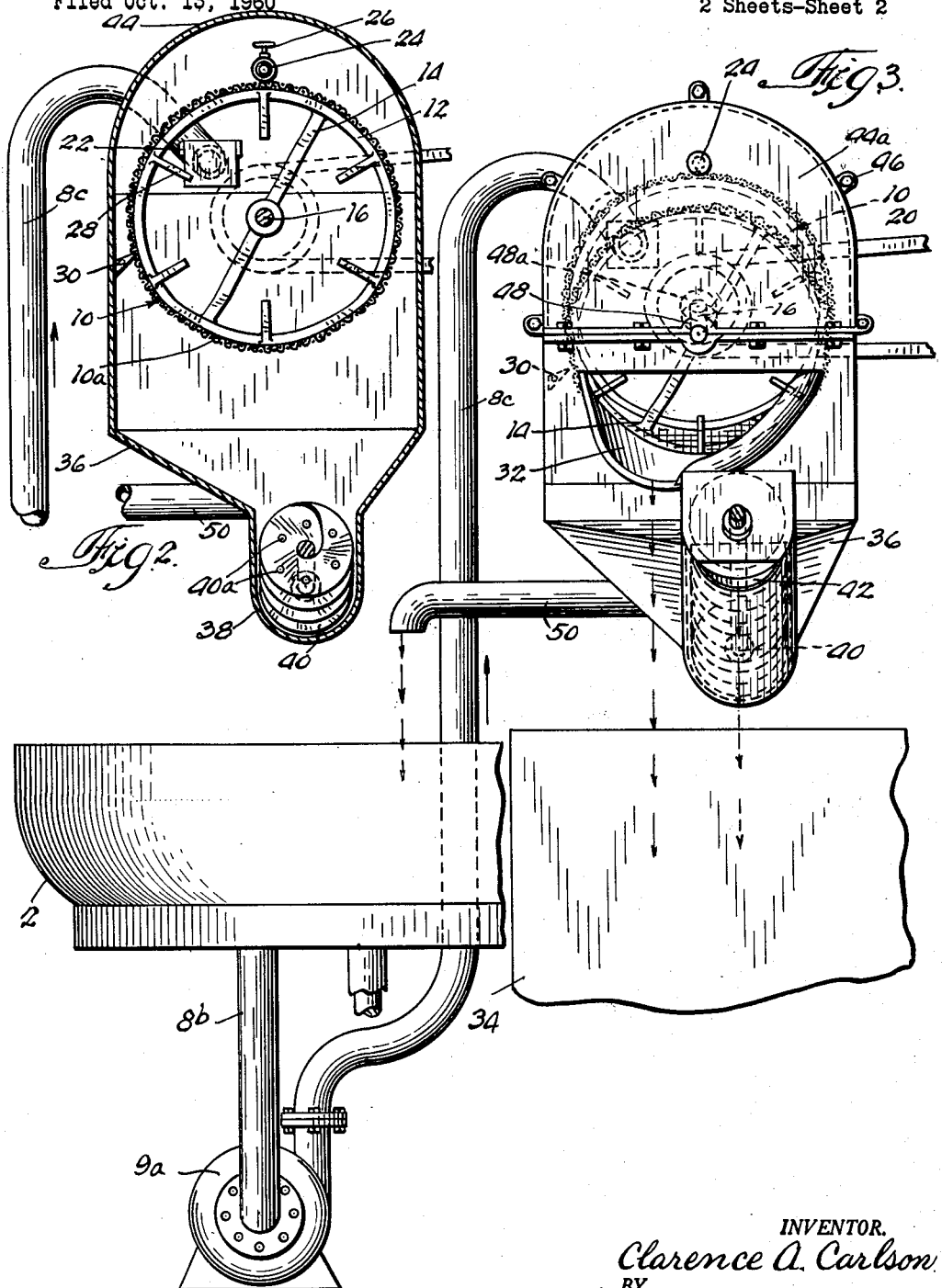

United States Patent Office 3,113,733
Patented Dec. 10, 1963

3,113,733
APPARATUS AND METHOD FOR EXTRACTING TRASH
Clarence A. Carlson, Chicago, Ill., assignor to United States Gypsum Company, Chicago, Ill., a corporation of Illinois
Filed Oct. 13, 1960, Ser. No. 62,490
6 Claims. (Cl. 241—68)

This invention relates to an apparatus and method for extracting trash and so-called junk from paper beaters, pulp slushers and other similar machines generally used in defibering paper stock. More particularly, this invention relates to a new and novel device and method for extracting and screening several different types of trash simultaneously from a waste paper slusher without substantially interrupting the operation of the slusher.

The reconversion of waste paper into usable paper products has grown into a large industry, so large and with such a huge volume of business that the normal reconversion procedure has demonstrated a pressing need for a solution to the problem of separating trash from the waste paper. Since, in properly preparing waste paper stock for delivery to a paper making machine the stock must be subjected to a pulping and defibering action and to a soaking and fibrillating action, the normal procedure heretofore has been to split a bale of raw waste paper and immediately throw the whole bale, including ties, wires, and miscellaneous trash into a slushing machine. There, in a large vat or tub provided with a beating mechanism, a hydraulic action is created which beaks up and defibers the stock while soaking and fibrillating it. Obviously the step of casting the whole raw bale into a slusher, although time saving, contaminates the paper slush and creates a trash removal problem.

The various types of trash which are found in bales of raw waste paper stock and which must be removed at a cost of considerable time and effort include foreign materials not capable of being defibered with the stock and thus not capable of being converted into a paper product. Examples of such types of trash or solid materials are wet strength paper as in paper towels, metal such as paper clips, baling wire or metal straps, and other miscellaneous refuse including pieces of wood, sand, rubber, dirt, glass and rope. If not removed when they accumulate in the paper slushing machine, these types of trash will eventually cause time-consuming and expensive shutdowns. This problem has been apparent during ordinary slushing operations and to solve it various devices have been tried.

Continuous waste paper slushers have, for instance, prior to this invention utilized a junker and a ragger to remove trash. The junker is designed to continuously remove the trash which accumulates in the bottom of the slushing machine vat by means of an elevator comprising an endless bucket conveyor operating on a chain and sprocket principle.

The ragger is designed to remove floating trash, such as baling wire or wet strength paper, capable of being formed into a rope-like strand. It is a machine much like a winch and adapted to grasp and pull a strand of trash out of the swirling mass within the slushing machine vat. To start it, a short length of rope is dropped into the vat to become entangled with baling wire and other rope-like trash. Then the ragger pulls the strand formed by the entanglement out of the vat at a rapid or slow rate according to the speed of a regulating means controlled by the quantity and quality of the trash. To dispose of the strand as it is pulled from the slusher, a guillotine cuts portions from the extracted end in suitably disposable lengths.

It is quite apparent that the removal of trash from a slushing machine by means of the so-called junker, ragger and guillotine has been a cumbersome procedure. It requires lengthy interruptions of the slushing operation. Nevertheless these devices have been considered the most practical means of removing trash from waste paper pulp slushers prior to the present invention.

Other problems have become evident in the use of machines such as the junker, ragger and guillotine. For one thing, initial cost is extremely high because most of the parts of each machine must be constructed to withstand the oxidizing and corrosive effects of repeated drenchings under humid operating conditions. Installation costs are considered high although several pieces of equipment are required. Moreover, the junker is hard to keep in operation because trash frequently becomes lodged in the elevator mechanism. The guillotine and the ragger are also subject to high maintenance costs due to the variety of trash passing through them. Also, but by far not the least important, the use of these machines results in an inefficient cleaning system because a high percentage of pulp is lost in comparison to the amount of waste paper introduced into the slushing machine.

It is, therefore, one object of the present invention to provide a trash extracting apparatus in which various types of trash may be accommodated simultaneously and removed from a waste paper slushing machine without substantial interference in the operation of the slushing machine.

Another object of this invention is to provide a trash extracting apparatus which is extremely efficient in eliminating losses of waste paper pulp removed from a waste paper slushing machine along with the trash.

A further object of this invention is to provide a trash extracting apparatus in which a maximum number of parts, including the waste paper pulping machine itself, are protected from being soaked many times during the trash extracting operation.

A further object of this invention is to provide a trash extracting apparatus in which a quantity of trash withdrawn from a waste paper slushing machine is passed across an agitatably mounted web and is thereby separated from waste paper slush adhering to the trash withdrawn from the machine.

A still further object of this invention is to provide a trash extracting apparatus in which a torque flow solids pump may be utilized to withdraw trash from a waste paper slushing machine and impel such trash upon an agitatably mounted screen.

Accordingly, in one embodiment of this invention there is provided an apparatus for separating substantially solid materials from an aqueous pulp suspension comprising a slushing machine and a web agitatably mounted adjacent to the slushing machine. A foraminous portion of the web has perforations of predetermined size for separating solid materials larger than the size of the perforations from solid materials and pulp particles in said suspension passable through said portion. A conduit is positioned in communication with the slushing machine and the web so that an impelling means, provided for withdrawing solid materials into the conduit from the slushing machine, discharges such solid materials from the conduit onto the web. A hopper, adjacent to the web, is arranged to collect solid materials and pulp particles passing through the perforations.

This invention, together with the further objects and advantages, will be best understood by reference to the following description taken in conjunction with the accompanying drawings, in which:

FIGURE 1 is a perspective view of the apparatus showing a portion of the housing cut away and a portion of the screen within the housing also cut away;

FIG. 2 is a sectional view taken along line 2—2 of FIG. 1; and

FIG. 3 is an end elevational view taken in the direction of arrows 3—3 in FIG. 1.

Referring more particularly to the drawing, a slushing vat 2 of a waste paper slushing machine is provided with a rotor 4 carrying knife blades 6 or other defibering or agitating means for breaking up waste paper stock placed in the vat. A water supply or other fluid supply means (not shown) is provided to initially fill the vat and to maintain a proper fluid consistency therein during the slushing operation.

From the base of the vat a conduit 8, having a shutoff valve 8a, leads to a specially designed pump 9 disposed intermediate the portions of conduit 8 designated at 8b and 8c. Such a pump, preferably a centrifugal pump with a recessed impeller and operating on a fluid coupling principle, is known in the art as a torque flow solids pump. It is adapted to withdraw all sizes of trash from the slushing machine vat and impel such trash through successive conduits 8b and 8c without becoming clogged by wire, rope, glass, sand and other materials of varying sizes or shapes. Inside pump housing 9a the impeller (not shown) is provided with radiating blades having interstitial recesses so that the face of the impeller gives the appearance of half an orange with the segments partially dished out. When it is rotated a torque flow is created from conduit 8b across the impeller face into conduit 8c, the design of the impeller being such that rope-like trash and solids are prevented from winding on or otherwise clogging the impeller to cause a shutdown. Such a pump, known as the Wemco torque flow solids pump, has been successfully operated in this invention.

While this invention will not operate as well using the presently known diaphragm types of pumps or any pump which depends upon the action of valves where string-like material or solids of the kind here involved will become entangled, it should be noted that this invention is not limited to the specific design of pump herein described. Any pump designed so as not to become clogged with solids or string-like material and thereby continuously impel such material through the conduit is satisfactory.

In the illustrated embodiment of this invention conduit portion 8c extends from the pump to communicate with a substantially cylindrically shaped screen 10 supported inside by a ring 12 attached to the screen. The ring spokes 14 inside the screen are affixed at their converging ends upon a shaft 16 in order to position the screen on the shaft. The shaft in turn is situated along an axis which extends through both ends of the screen cylinder. One end of the shaft protruding from the screen has affixed thereto a driving wheel 18 about which a V-belt 20 may be engaged to connect the shaft with a source of power for either completely revolving the screen or partially rotating it back and forth in alternating directions.

At the end of conduit portion 8c which extends toward the screen a deflector 22 is arranged so that trash withdrawn from vat 2 and impelled toward the screen through the conduit will be widely dispersed inside of and upon the screen. A perforated pipe 24, positioned adjacent the screen and provided with a valve 26 for letting fluid into the portion of the pipe near the screen, forms a shower means for activating sprays 26a and directing them against the screen.

From the inner surface of the screen cylinder paddle blades 28 extend for a short distance to assist deflector 22 in dispersing the trash projected upon the screen from conduit 8c. Also outside the cylinder a stationary wiper blade 30 is disposed against the outer surface of the screen to keep the screen unplugged by wiping off small trash and pulp particles which are not washed completely through the screen by the sprays.

The screen is positioned adjacent to the slushing machine and along a decline from an upper input end, where trash withdrawn from vat 2 is initially deposited, to a lower discharge end where large pieces of trash rejected by the screen are discharged. At the lower discharge end of the screen a channeling plate 32 is affixed to direct the discharged trash into a trash receptacle 34. As will appear, the channeling plate should be arranged to direct the trash slightly to one side of a small trash receiving trough, to be described, which is located below the screen cylinder from which the large trash is discharged.

In the preferred embodiment screen 10 is constructed with a mesh of a predetermined size according to the size of trash anticipated so that most of such trash will not pass the mesh, and being rejected thereby, will be conducted from one end of the screen to the other to be discharged into receptacle 34. However, small pieces may pass through the screen along with most of the pulp particles which were mixed with the trash in the vat. Such small trash, and the paper particles suspended in the contaminated slush, are drawn from the vat and are washed through the screen, into a suitable container such as hopper 36 positioned below the screen as the screen is revolved or agitated. It is contemplated, it should be noted, that screen 10 may be constructed if desired with only a foraminous lower portion 10a so that even though the screen is not completely rotated the small trash and pulp particles will pass into the hopper through said portion.

Extending from the bottom of the hopper a receiving trough 38, which contains a conveyor 40, collects and conducts the small trash settling in the hopper to the trash receptacle 34. Dishcarge spout 42 depending from the trash receiving trough and positioned over the receptacle provides a discharge opening for particles conveyed along the trough.

Since the trash handled by this invention is of varying sizes and shapes, it may at times be necessary to change the mesh size for different types of trash. Therefore, a housing 44, which assists in containing the shower sprays and wet trash and paper particles thrown off by centrifugal force from the screen and prevents repeated drenching of most of the surrounding equipment, is provided with an end plate 44a capable of being removed by disengagement of lugs 46. A portion of shaft bearing 48 may then be removed with plate 44a in order to free shaft 16 at the discharge end of the screen. Bearing 48a at the other end of the shaft may be arranged to accommodate removal of the shaft therefrom so that the whole screen assembly may be removed and another of different mesh size but of similar proportion substituted. The new screen assembly is put in place by inserting one end of the shaft in bearing 48a at the input end of the screen and positioning the other end of the shaft in bearing 48 at the discharge end of the screen as end plate 44a is fastened back in position.

From the hopper 36 an overflow spout 50 extends back to the vat 2 of the waste paper slushing machine, thereby providing a drain for washing fluid collected in the hopper and for waste paper pulp particles collected in the pulp suspension in the hopper. Also, in order to conduct the pulp suspension to the vat after the small trash has settled toward the bottom of the hopper, receiving trough 38 is preferably inclined upwardly from a lower end beneath the hopper toward a higher end adjacent the discharge end of screen 10. Small sieve-like holes 40a arranged in the worm or blade of the conveyor provide a means for fluid to be drained away from spout 42 and back into the hopper. Also, the overflow spout 50 is disposed from the hopper at a level below the upper end of the receiving trough to insure that the aqueous pulp suspension is allowed to flow out of spout 50 back into vat 2 instead of being discharged into receptacle 34 where only trash is deposited.

In operation, raw waste paper stock, usually in bales, is thrown or placed in the partially fluid-filled vat 2 of the slushing machine. Rotor 4 is spun rapidly so that knives 6 effectively break up and mix the stock with the fluid into a mass of slush, forming an aqueous pulp suspension contaminated by the trash while it is in the vat. Timewise, it has been found to be expedient, even with trash removal apparatus preceding the present invention, not to sift through the bales to separate trash from the usable stock before placing the bales in the vat.

After the slushing machine has been operated for a period of time sufficient to create a proper slush consistency and to collect an accumulation of trash, the slushing operation is halted for a few moments while shutoff valve 8a is opened to permit slush contaminated with trash to be withdrawn from the vat by pump 9. All trash and the pulp suspension withdrawn are then passed through conduit 8 by an impelling means onto the screen which is agitated either by complete or partial revolutions initiated through belt 20. Shower 24 is activated by opening valve 26 in the shower pipe and sprays of water are directed toward the screen. Paddles 28 assist deflector 22 in dispersing and agitating the trash and slush so that a maximum amount of pulp particles and small trash are washed from the larger pieces of trash and flushed through the screen mesh. Simultaneously, large items of trash rejected by the screen are turned over several times by the agitation of the screen, exposing all surfaces to the sprays. Due to the declining position of the screen, the large trash items gravitate from the input end to the discharge end, and from this point are directed by channeling plate 32 into the trash receptacle.

Small particles of trash passing through the screen settle toward the bottom of the hopper positioned beneath the screen and are conveyed from the bottom of the hopper, along the small trash receiving trough, by the conveyor 40 and out the discharge spout 42 which also extends over the trash receptacle. It should be noted that even though both large and small pieces of trash are deposited in the receptacle, neither one at any time interferes in the course of the other through the apparatus. The position of channeling plate 32 directs large items of trash aside from the trash receiving trough containing the conveyor, and large trash items are dropped with small trash items, side by side, into the receptacle.

The accumulation of pulp particles separated from the trash builds up in the hopper to be returned to the vat of waste paper pulp through the drain spout. Since such particles are entrained in the suspension mixture they are drained back with it into the vat. Only the trash items are discharged into the receptacle 34, so that a highly efficient separating operation is effected with a minimum amount of pulp loss.

It will thus be apparent that this invention provides a reliable and economical trash separator for removing all kinds of trash from the vat of a waste paper slushing machine. It is understood, of course, that this invention is not to be limited to the particular embodiment shown and described above, since many modifications may be made, and it is contemplated by the appended claims to cover such modifications as fall within the true spirit and scope of this invention:

What is desired to be claimed is:

1. An apparatus for separating substantially solid materials from an aqueous pulp suspension contaminated by said solid materials comprising a slushing machine, a cylindrical screen mounted adjacent to and in cooperative relationship with the slushing machine and having a mesh with perforations of predetermined size for separating solid materials larger than the size of the perforations from solid materials and pulp particles in said suspension passable through the mesh, said screen being positioned along a decline from a higher input end of said screen to a lower discharge end and being revolvable about an axis passing through each of said ends, a conduit in communication with the slushing machine and the screen, a pump connected to the conduit intermediate the slushing machine and the screen for withdrawing the contaminated suspension into the conduit from the slushing machine and discharging said contaminated suspension from the conduit onto the inside of the screen at said input end thereof, a hopper positioned below and in cooperative relationship with the screen to collect small solid materials and pulp particles passing through the mesh of the screen, and conveyor means extending from the bottom of the hopper for removing said small solid materials passed by the mesh of the screen and settled toward the bottom of the hopper.

2. An apparatus for separating substantially solid materials from an aqueous pulp suspension contaminated by said solid materials comprising a slushing machine, a cylindrical screen mounted adjacent to the slushing machine and having a mesh with perforations of predetermined size for separating solid materials larger than the size of the perforations from solid materials and pulp particles in said suspension passable through the mesh, said screen being positioned along a decline from a higher input end of said screen to a lower discharge end and being revolvable about an axis passing through each of said ends, a conduit in communication with the slushing machine and the screen, a pump connected to the conduit intermediate the slushing machine and the screen for withdrawing the contaminated suspension into the conduit from the slushing machine and discharging said contaminated suspension onto the inside of the screen at said input end thereof, a hopper positioned below the screen and arranged to collect small solid materials and pulp particles passing through the mesh of the screen, a receiving trough arranged at the bottom of the hopper adapted for collecting said small solid materials passed by the screen, and conveyor means disposed in the receiving trough for removing solids passed by the screen and settled toward the bottom of the hopper to a discharge opening in the trough.

3. In a process for separating substantially solid materials from an aqueous pulp suspension contaminated by said solid materials, the steps which comprise simultaneously extracting the solid materials and pulp suspension from a pulp slushing machine, agitating the extracted solid materials and pulp suspension on a screen having a mesh with perforations of predetermined size for separating solid materials larger than the size of the perforations from solid materials and pulp particles in said suspension passable through the mesh, collecting the solid materials and pulp particles passing through the mesh in a container, and draining the suspension from said container substantially free from solid materials after the solid materials passing through the mesh have settled toward the bottom of the container.

4. In a process for separating substantially solid materials from an aqueous pulp suspension contaminated by said solid materials, the steps which comprise simultaneously extracting the solid materials and pulp suspension from a pulp slushing machine, agitating the extracted solid materials and pulp suspension on a screen having a mesh with perforations of predetermined size for separating solid materials larger than the size of the perforations from solid materials and pulp particles in said suspension passable through the mesh, spraying the solid materials and pulp suspension with a washing fluid during the agitation on the screen, collecting the solid materials and pulp particles and washing fluid passing through the mesh in a container, and draining the suspension and the washing fluid from said container substantially free from solid materials after the solid materials passing through the mesh have settled toward the bottom of the container.

5. In a process for separating substantially solid materials from an aqueous pulp suspension contaminated by said solid materials, the steps which comprise simultaneously extracting the solid materials and pulp suspension from a pulp slushing machine, depositing the extracted solid materials and pulp suspension on a screen disposed at a decline from an upper input end to a lower discharge end, said screen having a mesh with perforations of predetermined size for separating solid materials larger than the size of the perforations from solid materials and pulp particles in said suspension passable through the mesh, agitating the extracted solid materials and pulp suspension while passing said solid materials along the length of the screen from the input end thereof to the discharge end, spraying the solid materials and pulp suspension with a washing fluid during the agitation on the screen, collecting the solid materials and pulp particles and washing fluid passing through the mesh in a container, and draining the suspension and the washing fluid from said container substantially free from solid materials after the solid materials passing through the mesh have settled toward the bottom of the container.

6. In a process for separating substantially solid materials from an aqueous pulp suspension contaminated by said solid materials in the vat of a waste paper slushing machine, the steps which comprise simultaneously extracting the solid materials and paper slush from the waste paper slushing machine, depositing the extracted solid materials and paper slush on a screen disposed at a decline from an upper input end to a lower discharge end, said screen having a mesh with perforations of predetermined size for separating solid materials larger than the size of the perforations from solid materials and slush particles passable through the mesh, agitating the extracted solid materials and paper slush while passing said solid materials along the length of the screen from the input end thereof to the discharge end, spraying the solid materials and paper slush with a washing fluid during the agitation of said solid materials and paper slush on the screen, collecting the solid materials and slush particles and washing fluid passing through the mesh in a container, draining the suspension and the washing fluid from said container substantially free from solid materials after the solid materials passing through the mesh have settled toward the bottom of the container, and conducting the slush particles drained from the container into the vat of the slushing machine.

References Cited in the file of this patent

UNITED STATES PATENTS

| | | |
|---|---|---|
| 612,404 | Davis | Oct. 18, 1898 |
| 719,582 | Gray | Feb. 3, 1903 |
| 1,202,504 | Frerichs | Oct. 24, 1916 |
| 2,033,123 | Cowles | Mar. 10, 1936 |
| 2,078,235 | Chapman | Apr. 27, 1937 |
| 2,089,215 | Lomax | Aug. 10, 1937 |
| 2,228,185 | Thompson | Jan. 7, 1941 |
| 2,238,962 | Young | Apr. 22, 1941 |
| 2,294,060 | Wiener | Aug. 25, 1942 |
| 2,331,135 | Ovestrud | Oct. 5, 1943 |
| 2,331,455 | Cowles | Oct. 12, 1943 |
| 2,592,215 | Wandel | Apr. 8, 1952 |
| 2,658,453 | Walters | Nov. 10, 1953 |
| 2,942,731 | Soldini | June 28, 1960 |
| 2,970,776 | Buckman | Feb. 7, 1961 |

FOREIGN PATENTS

| | | |
|---|---|---|
| 945,831 | Germany | July 19, 1956 |